Patented Dec. 19, 1933

1,939,691

UNITED STATES PATENT OFFICE 1,939,691

INFUSIBLE SYNTHETIC RESINS AND A PROCESS OF MAKING SAME

Paul Haller, Berne, and Hans Kappeler, Basel, Switzerland, assignors, by mesne assignments, to Ciba Products Corporation, Dover, Del.

No Drawing. Application February 4, 1927, Serial No. 166,006, and in Switzerland February 17, 1926

22 Claims. (Cl. 260—130)

The present invention relates to infusible synthetic resins from primary aromatic amines and formaldehyde compound, and it comprises the process for the manufacture of these resins, the new products themselves, as well as the application of the same in the synthetic resin industry.

It is known that aniline and other primary aromatic amines are capable of forming with formaldehyde compounds a whole series of condensation products, which, according to the choice of the conditions of reaction, show very different chemical and physical properties. Thus, for example, by causing aniline to react on formaldehyde, in presence of alkaline or weakly acid condensation agents, or in absence of agents promoting the condensation, and at moderate temperature anhydroformaldehydeaniline is formed; but at higher temperatures brittle, resinous condensation products are obtained capable to be melted, which are soluble in the usual solvents for resins, and which have been used as resin substitutes.

If strong acids are used or aniline salts of such acids, more yellow to orange colored, pulverulent masses are obtained at lower temperatures, or, at higher temperatures, more transparent red, brittle, insoluble and infusible resins, the properties of which do not allow a practical utilization.

It has now been found that valuable synthetic resins are obtained, which possess a woodlike, bony or horny appearance, by causing a primary aromatic amine to react, in presence of approximately at least an equivalent proportion of a strong mineral acid, with more than one molecular proportion of a formaldehyde compound, then treating the form-pieces thus obtained with soluble agents apt to materially eliminate the action of the mineral acid present, and finally washing and drying the resulting product.

By condensing for example aniline, in presence of an equivalent quantity of hydrochloric acid, and at moderate temperature, with an excess of formaldehyde, a red, colloidal solution is first formed, which solidifies to a jelly when left for some time. This latter, when left to itself, gradually passes over into a red, brittle, insoluble resin, which easily disintegrates, however, and is therefore of no practical use.

However, by subjecting the jelly obtained to a subsequent treatment with inorganic or organic bases, such as, for example, solutions of alkali, aqueous ammonia, pyridine, methylamine, or basic, neutral, or acid salts, such as sodium sulfite, sodium bisulfite, ammonium sulfide, alkali metal sulfide, ammonium chloride, acetate of lead, and the like, or finally with weak acids, such as for example acetic acid, tannic acid, or with other soluble agents apt to materially eliminate the effect of the strong mineral acid present, either by direct neutralization or by displacement, the resin assumes quite different valuable properties and changes into a toughly elastic, and according to the manner and duration of the after-treatment, into a non-transparent feebly colored, or more transparent, yellow to reddish mass.

Instead of aniline its homologues, such as for example, o-toluidine, or respectively, a mixture of the different toluidines, further α- or β-naphthylamine and other aromatic amines, or respectively, mixtures of such amines with aniline, may be used.

Also condensation products of primary aromatic amines with formaldehyde compounds, as for example anhydroformaldehydeaniline, can in a similar manner be converted into synthetic resins of the above described properties.

Instead of formaldehyde itself also its polymers or any other substance splitting off formaldehyde under the conditions of the condensation may be used.

The term "primary aromatic amine" as employed in this application, is intended to cover not only true primary aromatic amines but also such substances which under the conditions of the condensation described herein, also act like the true primary aromatic amines, for example, anhydroformaldehydeaniline, as explained in Example 5 hereinafter.

In place of hydrochloric acid also sulfuric acid, nitric acid, and other strong mineral acids may be used. Instead of in its free form, the acid may also be employed in form of the respective amine salts, adding, if necessary, still an excess of free acid.

The condensation is appropriately carried out in presence of solvents, such as for example, water or mixtures of water and water-soluble organic solvents, as for example, alcohol, acetone, and the like.

The reaction temperature may vary within fairly wide limits, according to the selection of the starting material, or of the concentration of the reaction mixture and the like.

The products obtained represent solid, tough, infusible masses which are insoluble in the usual solvents, and resistant against lyes and dilute acids. The specific gravity and appearance of these resins varies within fairly wide limits, (about 0.5 to 1.0) according to the conditions of reaction. The specifically lighter resins appear more woodlike, the specifically heavier resins more bonelike or hornlike. The new products are easily turnable and are intended to be particularly employed for the manufacture of artificial objects and as insulating material.

If the reaction is carried out in a sufficient dilution, one succeeds in obtaining colloidal solutions which remain liquid for a fairly long time and which may in this form be employed as impregnating agents, and the like, the subsequent treatment with bases, salts, and the like being then accomplished on the impregnated material itself.

The appearance and the properties of the product obtained may also be influenced by the addition of substances which either participate in the reaction or act as softening agents or filling materials. As such additions glycerine, cellulose, sawdust, leather dust, cork dust, heavy spar, asbestos, talcum, and the like, may for instance be mentioned. Furthermore dyestuffs, like nigrosine, indigo, eosine, and the like, may be incorporated. Finally the end product may also be treated with impregnating agents.

Example 1

To 93 parts by weight of aniline (1 molecular proportion) suspended in 50–100 parts by weight of water, 150 parts by weight of hydrochloric acid of 25 per cent strength (1 molecular proportion) are added and the salt solution mixed with 135 parts by weight of formaldehyde of 40 per cent strength (1¾ molecular proportions). By means of cooling the reaction temperature is kept at 40–60° C. A red, colloidal solution is formed which is poured into molds. After the principal reaction is at an end the whole is kept at a moderate temperature by warming. Thus a jelly is formed which soon becomes turbid and after some time solidifies with the main quantity of the solvent so that it can be taken out of the mold.

If this product is left to itself, it finally passes into a red, brittle, insoluble resin, under disintegration of the form-pieces.

However, if these form-pieces, either directly after the solidification, or after having first undergone a drying process at a moderate temperature, are subjected to a subsequent treatment with inorganic or organic bases or basic, neutral or acid salts or weak acids, they maintain their form and assume entirely different and more valuable properties.

When using a lye or aqueous ammonia or an organic base for the subsequent treatment, a slightly yellowish, toughly elastic mass is obtained. If the subsequent treatment is effected with acetic acid, tannic acid, or with salts, similar, but more transparent and more brittle, yellowish to reddish products are obtained. The duration of the subsequent treatment has also an influence on the appearance and the properties of the products obtained.

The products thus subsequently treated are dried, after having been washed, by heating to over 100° C. By boiling with impregnating agents, such as, for example, linseed oil or other oils, they may be infiltrated with these substances.

Example 2

A mixture is prepared of 70 parts by weight of aniline and 30 parts by weight of o-toluidine. This is suspended in a mixture of 100 parts by weight of water and 50 parts by weight of glycerine with 150 parts by weight of hydrochloric acid of 25 per cent strength (somewhat more than 1 molecular proportion), or with a corresponding quantity of hydrofluoric acid, sulfuric acid, nitric acid, and the like. To the solution thus obtained there are added 120 parts by weight of formaldehyde of 40 per cent strength (somewhat more than 1½ molecular proportions). The reaction occurs similarly as described in Example 1, but the reaction temperature must be maintained somewhat higher than there.

The working up of the product thus obtained is accomplished as in Example 1 and leads to similar end products.

Instead of o-toluidine also technical mixtures of toluidine or higher homologues of aniline may be employed.

Example 3

1 molecular proportion of a mixture containing 80 per cent of aniline and 20 per cent of α- or β-naphthylamine, or of a mixture of the two isomerides, is treated under acid conditions with 1.2 molecular proportions of hydrochloric acid and 2 molecular proportions of formaldehyde, as described in Example 1. There result products having similar properties.

Example 4

A mixture is prepared of 100 parts by weight of aniline, 100 parts by weight of hydrochloric acid of 38 per cent strength and 750 parts by weight of water. To this there are added, without cooling, 150 parts by weight of formaldehyde of 40 per cent strength.

The mixture remains liquid for some time. The temperature rises to about 40° C. The reaction mixture is left to stand at about 30° C. until the mass becomes solid, yellow, and finally of a transparent red. This product is treated with caustic soda solution, washed, and dried at 120° C., the mass thus obtained being extraordinarily hard and tough.

The liquid product obtained, prior to the treatment with caustic soda solution, may be employed for impregnating purposes and afterwards subjected to the herein described after-treatment on the impregnated material.

Example 5

100 parts by weight of anhydroformaldehyde-aniline, suspended in 100 to 150 parts by weight of water, are mixed with 180 parts by weight of hydrochloric acid of 25 per cent strength (1 molecular proportion) and 75 parts by weight of formaldehyde of 40 per cent strength (1 molecular proportion) and heated on the water-bath until the red, colloidal solution mentioned in Example 1 has been formed, which is then worked up in the same manner. There are obtained similar products as mentioned in the said example.

What we claim is:—

1. Process for the manufacture of infusible synthetic resins by causing one molecular proportion of aniline to react, in presence of at least approximately an equivalent proportion of a strong mineral acid, with more than one molecular proportion of formaldehyde until solid jellies are formed, then treating the latter with an agent which substantially eliminates the effect of the mineral acid, and finally washing and drying the resulting product.

2. Process for the manufacture of infusible synthetic resins by causing one molecular proportion of a primary aromatic amine to react in presence of at least approximately an equivalent proportion of a strong mineral acid, with more than one molecular proportion of a formaldehyde-yielding compound until solid jellies are formed, then treating the latter with an agent which substantially eliminates the effect of the mineral acid, and finally washing and drying the resulting product.

3. Process for the manufacture of infusible synthetic resins by causing one molecular proportion of aniline to react in presence of at least approximately an equivalent proportion of a strong mineral acid and in presence of a diluent, with more than one molecular proportion of formaldehyde until solid jellies are formed, then treating the latter with an agent which substantially eliminates the effect of the mineral acid, and finally washing and drying the resulting product.

4. Process for the manufacture of infusible synthetic resins by causing one molecular proportion of a primary aromatic amine to react in presence of at least approximately an equivalent proportion of a strong mineral acid and in presence of a diluent, with more than one molecular proportion of a formaldehyde-yielding compound until solid jellies are formed, then treating the latter with an agent which substantially eliminates the effect of the mineral acid, and finally washing and drying the resulting product.

5. Process for the manufacture of infusible synthetic resins by causing one molecular proportion of aniline to react in presence of at least approximately an equivalent proportion of a strong mineral acid, with at least 1½ molecular proportions of formaldehyde until solid jellies are formed, then treating the latter with an agent which substantially eliminates the mineral acid, and finally washing and drying the resulting product.

6. Process for the manufacture of infusible synthetic resins by causing one molecular proportion of aniline to react, in presence of at least approximately an equivalent proportion of a strong mineral acid, and in presence of a diluent, with at least 1½ molecular proportions of formaldehyde until solid jellies are formed, then treating the latter with an agent which substantially eliminates the effect of the mineral acid, and finally washing and drying the resulting product.

7. Process for the manufacture of infusible synthetic resins by causing one molecular proportion of a primary aromatic amine to react, in presence of at least approximately an equivalent proportion of a strong mineral acid with more than one molecular proportion of formaldehyde at tempertures below 100° C. until solid jellies are formed, then treating the latter with an agent which substantially eliminates the effect of the mineral acid, and finally washing and drying the resulting product.

8. Process for the manufacture of infusible synthetic resins by causing one molecular proportion of aniline to react, in presence of at least approximately an equivalent proportion of a strong mineral acid, with at least 1½ molecular proportions of formaldehyde at temperatures below 100° C. until solid jellies are formed, then treating the latter with an agent which substantially eliminates the effect of the mineral acid, and finally washing and drying the resulting product.

9. Process for the manufacture of infusible synthetic resins by causing one molecular proportion of aniline to react, in presence of at least approximately an equivalent proportion of a strong mineral acid and in presence of a diluent, with at least 1½ molecular proportions of formaldehyde at temperatures below 100° C. until solid jellies are formed, then treating the latter with an agent which substantially eliminates the effect of the mineral acid, and finally washing and drying the resulting product.

10. Process for the manufacture of infusible synthetic resins by causing one molecular proportion of a primary aromatic amine to react, in presence of at least approximately an equivalent proportion of a strong mineral acid and in presence of glycerine, with more than one molecular proportion of a formaldehyde-yielding compound until solid jellies are formed, then treating the latter with an agent which substantially eliminates the mineral acid, and finally washing and drying the resulting product.

11. Process for the manufacture of infusible synthetic resins by causing one molecular proportion of a salt of a primary aromatic amine to react at temperatures substantially below 100 degrees C. with more than one molecular proportion of a formaldehyde-yielding compound, then treating the latter with an agent which substantially eliminates the effect of the acid component of the salt, and finally washing and drying the material.

12. Process for the manufacture of infusible synthetic resins by causing one molecular proportion of a salt of a primary aromatic amine to react at temperatures substantially below 100 degrees C. with more than one molecular proportion of a formaldehyde-yielding compound in presence of a diluent, then treating the latter with an agent which substantially eliminates the effect of the acid component of the salt, and finally washing and drying the material.

13. The process for the manufacture of infusible synthetic resins which comprises causing one mol of a primary aromatic amine to react at temperatures substantially below 100 degrees C. in the presence of at least approximately an equivalent proportion of strong mineral acid with more than one mol of a formaldehyde-yielding compound in presence of a diluent, thereafter treating the reaction product with an agent which substantially eliminates the effect of the mineral acid, and finally washing and drying the resultant product.

14. The process for the manufacture of infusible synthetic resins which comprises causing one molecular proportion of a primary aromatic amine to react at temperatures substantially below 100 degrees C. in the presence of at least approximately an equivalent proportion of strong mineral acid with more than one molecular proportion of a formaldehyde-yielding compound, thereafter treating the reaction product with an agent which substantially eliminates the effect of the mineral acid, and finally washing and drying the resultant product.

15. An infusible synthetic resin comprising the product obtained by causing one molecular proportion of a primary aromatic amine to react at temperatures substantially below 100 degrees C. in the presence of at least approximately an equivalent proportion of a strong mineral acid with more than one molecular proportion of a formaldehyde-yielding compound, and thereafter treating the reaction product with an agent which substantially eliminates the effect of the mineral acid.

16. The process for the manufacture of infusible synthetic resins which comprises causing one mol of aniline to react at temperatures substantially below 100 degrees C. in the presence of at least approximately an equivalent proportion of strong mineral acid with more than one mol of formaldehyde in presence of a diluent, thereafter treating the reaction product with an agent which substantially eliminates the effect of the mineral acid, and finally washing and drying the resultant product.

17. The process for the manufacture of infusible synthetic resins which comprises causing one molecular proportion of aniline to react at temperatures substantially below 100 degrees C. in the presence of at least approximately an equivalent proportion of strong mineral acid with more than one molecular proportion of formaldehyde, thereafter treating the reaction product with an agent which substantially eliminates the effect of the mineral acid, and finally washing and drying the resultant product.

18. An infusible synthetic resin comprising the product obtained by causing one molecular proportion of aniline to react at temperatures substantially below 100 degrees C. in the presence of at least approximately an equivalent proportion of a strong mineral acid with more than one molecular proportion of formaldehyde, and thereafter treating the reaction product with an agent which substantially eliminates the effect of the mineral acid.

19. The process for the manufacture of infusible synthetic resins by causing one molecular proportion of a salt of aniline to react at temperatures substantially below 100° C. with more than one molecular proportion of formaldehyde, then treating the latter with an agent which substantially eliminates the effect of the acid component of the aniline, and finally washing and drying the material.

20. The process for the manufacture of infusible synthetic resins by causing one molecular proportion of a salt of aniline to react at temperatures substantially below 100° C. with more than one molecular proportion of formaldehyde in the presence of a diluent, then treating the latter with an agent which substantially eliminates the effect of the acid component of the aniline, and finally washing and drying the material.

21. An infusible synthetic resin comprising the product obtained by causing one molecular proportion of a salt of a primary aromatic amine to react at temperatures substantially below 100° C. with more than one molecular proportion of a formaldehyde-yielding compound, and thereafter treating the reaction product with an agent which substantially eliminates the effect of the acid component of the salt.

22. An infusible synthetic resin comprising the product obtained by causing one molecular proportion of a salt of aniline to react at temperatures substantially below 100° C. with more than one molecular proportion of formaldehyde, and thereafter treating the reaction product with an agent which substantially eliminates the effect of the acid component of the aniline.

PAUL HALLER.
HANS KAPPELER.